(12) United States Patent
McKenney (10) Patent No.: US 8,020,160 B2
(45) Date of Patent: Sep. 13, 2011

(54) USER-LEVEL READ-COPY UPDATE THAT DOES NOT REQUIRE DISABLING PREEMPTION OR SIGNAL HANDLING

(75) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 637 days.

(21) Appl. No.: 12/181,006

(22) Filed: Jul. 28, 2008

(65) Prior Publication Data

US 2010/0023946 A1   Jan. 28, 2010

(51) Int. Cl.
G06F 9/46 (2006.01)
G06F 7/00 (2006.01)

(52) U.S. Cl. ................... 718/100; 707/704; 707/999.008

(58) Field of Classification Search .................. 707/704, 707/999.008; 718/100
See application file for complete search history.

(56) References Cited

U.S. PATENT DOCUMENTS

| | | |
|---|---|---|
| 5,442,758 A | 8/1995 | Slingwine et al. |
| 5,608,893 A | 3/1997 | Slingwine et al. |
| 5,727,209 A | 3/1998 | Slingwine et al. |
| 6,219,690 B1 | 4/2001 | Slingwine et al. |
| 6,886,162 B1 | 4/2005 | McKenney |
| 6,996,812 B2 | 2/2006 | McKenney |
| 7,287,135 B2 | 10/2007 | McKenney et al. |
| 7,353,346 B2 | 4/2008 | McKenney et al. |
| 2005/0149634 A1 | 7/2005 | McKenney |
| 2005/0198030 A1 | 9/2005 | McKenney |
| 2006/0100996 A1 | 5/2006 | McKenney |
| 2006/0112121 A1 | 5/2006 | McKenney et al. |
| 2006/0117072 A1 | 6/2006 | McKenney |
| 2006/0123100 A1 | 6/2006 | McKenney |
| 2006/0130061 A1 | 6/2006 | McKenney |
| 2006/0265373 A1 | 11/2006 | McKenney et al. |
| 2007/0083565 A1 | 4/2007 | McKenney |
| 2007/0101071 A1 | 5/2007 | McKenney |
| 2007/0198520 A1 | 8/2007 | McKenney et al. |
| 2007/0226440 A1 | 9/2007 | McKenney et al. |
| 2007/0266209 A1 | 11/2007 | McKenney et al. |
| 2008/0033952 A1 | 2/2008 | McKenney et al. |
| 2008/0040720 A1 | 2/2008 | McKenney et al. |

(Continued)

OTHER PUBLICATIONS

McKenney et al. "Towards Hard Realtime Response from the Linux Kernel on SMP Hardware", linux.conf.au, Canberra, AU, 2005.*

(Continued)

Primary Examiner — Jennifer N. To
Assistant Examiner — Brian Chew
(74) Attorney, Agent, or Firm — Walter W. Duft (57) ABSTRACT

A user-level read-copy update (RCU) technique. A user-level RCU subsystem executes within threads of a user-level multithreaded application. The multithreaded application may include reader threads that read RCU-protected data elements in a shared memory and updater threads that update such data elements. The reader and updater threads may be preemptible and comprise signal handlers that process signals. Reader registration and unregistration components in the RCU subsystem respectively register and unregister the reader threads for RCU critical section processing. These operations are performed while the reader threads remain preemptible and with their signal handlers being operational. A grace period detection component in the RCU subsystem considers a registration status of the reader threads and determines when it is safe to perform RCU second-phase update processing to remove stale versions of updated data elements that are being referenced by the reader threads, or take other RCU second-phase update processing actions.

20 Claims, 8 Drawing Sheets

U.S. PATENT DOCUMENTS

| | | |
|---|---|---|
| 2008/0082532 A1 | 4/2008 | McKenney |
| 2008/0140951 A1 | 6/2008 | McKenney et al. |
| 2008/0177742 A1 | 7/2008 | McKenney et al. |

OTHER PUBLICATIONS

J. Seigh, "RCU + SMR for preemptive kernel/user threads," Linux Kernel Mailing List, May 9, 2005, 2 pages.

M. Michael, "Hazard Pointers: Safe Memory Reclamation for Lock-Free Objects," IEEE Transactions on Parallel and Distributed Systems, Jun. 2006, vol. 15, No. 6, pp. 491-504.

D. Sarma et al., "Making RCU Safe for Deep Sub-Millisecond Response Realtime Applications," 2004 USENIX (UseLinux track) Jun. 2004, 9 pages.

P. McKenney, "RCU vs. Locking Performance on Different CPUs," 2004 Linux.conf.au, 2004, 18 pages.

P. McKenney et al., "Scaling dcache with RCU," Linux Journal, Jan. 1, 2004, 12 pages.

P. McKenney et al., "Using RCU in the Linux 2.5 Kernel," Llnux Journal, Oct. 1, 2003, 11 pages.

P. McKenney et al.,"Read-Copy Update," 2002 Ottawa Linux Symposium, Jul. 8, 2002, 28 pages.

H. Linder et al., "Scalability of the Directory Entry Cache," 2002 Ottawa Linux Symposium, Jun. 26, 2002, pp. 289-300.

P. Mckenney et al., "Read-Copy Update," 2001 Ottawa Linux symposium, Jul. 2001, 22 pages.

P. McKenney et al., "Read-Copy Update: Using Execution History to Solve Concurrency Problems," PDCS, Oct. 1998, 11 pages.

S. Dietrich et al., "Evolution of Real-Time Linux," 7th RTL Workshop, Nov. 17, 2005, 18 pages.

B. Gamsa, "Tornado: Maximizing Locality and Concurrency in a Shared Memory Multiprocessor Operating System," 1999, 14 pages.

Molnar et al., "Realtime and Linux," 2005 Linux Kernel Summit, 8 pages.

H. Boehm, "The Space Cost of Lazy Reference Counting," ACM SIGPLAN Notices, Proceedings of the 31st ACM SIGPLAN-SIGACT Symposium on Principles of Programming Languages, POPL '04, vol. 39, Issue 1, Jan. 2004, p. 210-219.

M. Michael, "Scalable Lock-Free Dynamic Memory Allocation," ACM SIGPLAN Notices, Proceedings of the ACM SIGPLAN 2004 Conference on Programming Language Design and Implementation; PLDI '04, vol. 39, Issue 6, Jun. 2004, p. 35-46.

D. Dice et al., "Mostly Lock-Free Malloc," ACM SIGPLAN Notices, Proceedings of the 3rd International Symposium on Memory Management, ISMM '02, vol. 38, Issue 2 Supplement, Jun. 2002, p. 163-174.

J. Corbet, "Read-copy-update for realtime," LWN.net, Sep. 26, 2006, 3 pages.

"Priority Inversion," Wikipedia, Feb. 4, 2007, 3 pages.

McKenney, "Seven real-time Linux approaches (Part C)", LinuxDevices.com, Jun. 7, 2005, 13 pages.

P. McKenney, "RCU and CONFIG_PREEMPT_RT progress," Linux Kernel Mailing List, May 9, 2005, 2 pages.

O. Nesterov, QRCU: 'Quick' SRCU Implementation, Linux Kernel Mailing List, Dec. 1, 2005, 3 pages.

T. Gleixner, "High Resolution Timers/Dynamic Ticks-V2", LWN. net, Oct. 1, 2006, 6 pages.

P. Mckenney, "Sleepable RCU", LWN.net, Oct. 9, 2006, 10 pages.

O. Nesterov, "cpufreq_tsc() as core_initcall_sync", LKML.org, Nov. 19, 2006, 2 pages.

P. McKenney, "Using RCU in the Linux 2.5 Kernel", Kernel Korner, Oct. 1, 2003,11 pages.

A. Kleen, "How to do nothing efficiently or better laziness: No Idle tick on x86-64", 2005, 16 pages.

P. McKenney, "Read-Copy Update Implementations", 2001, 3 pages.

M. Herlihy, "A Methodology for Implementing Highly Concurrent Data Objects," ACM Transactions on Programming Languages and Systems, vol. 15, Issue 5, Nov. 1993, pp. 745-770.

M. Michael, "Safe Memory Reclamation for Dynamic Lock-Free Objects Using Atomic Reads and Writes," Proceedings of the 21st Annual ACM Symposium on Principles of Distributed Computing, Jul. 2002, 10 pages.

N. Barghouti et al, "Concurrency Control in Advanced Database Operations," Jan. 1994, 83 pages.

P. McKenney, "Exploiting Deferred Destruction: An Analysis of Read-Copy-Update Techniques in Operating System Kernels," OGI School of School of Science & Engineering at Oregon Health & Science University, Jul. 2004, pp. 1-380.

P. McKenney et al., "Extending RCU for Realtime and Embedded Workloads," 2006 Ottawa Linux Symposium, Aug. 11, 2006, 15 pages.

P. McKenney, "The design of preemptible read-copy-update," LWN. net, Oct. 8, 2007, 27 pages.

\* cited by examiner

USER-LEVEL READ-COPY UPDATE THAT DOES NOT REQUIRE DISABLING PREEMPTION OR SIGNAL HANDLING

BACKGROUND OF THE INVENTION

1. Field of the Invention

The present invention relates to computer systems and methods in which data resources are shared among concurrent data consumers while preserving data integrity and consistency relative to each consumer. More particularly, the invention concerns an implementation of a mutual exclusion mechanism known as "read-copy update" in a user-level computing environment.

2. Description of the Prior Art

By way of background, read-copy update is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to multiprocessor computing environments in which the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of operations that may be currently referencing the data. The other view is the new (post-update) data state that is available for the benefit of operations that access the data following the update. In the second (deferred update) phase, the old data state is removed following a "grace period" that is long enough to ensure that all executing operations will no longer maintain references to the pre-update data.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables.

Figure 1A:
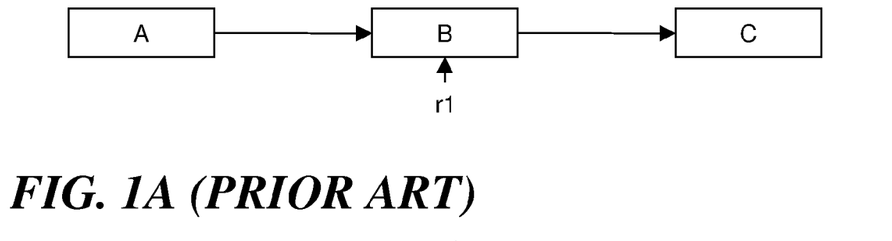
FIGS. 1A-1D are diagrammatic representations of a linked list of data elements undergoing a data element replacement according to a conventional read-copy update mechanism.
Figure 1B:
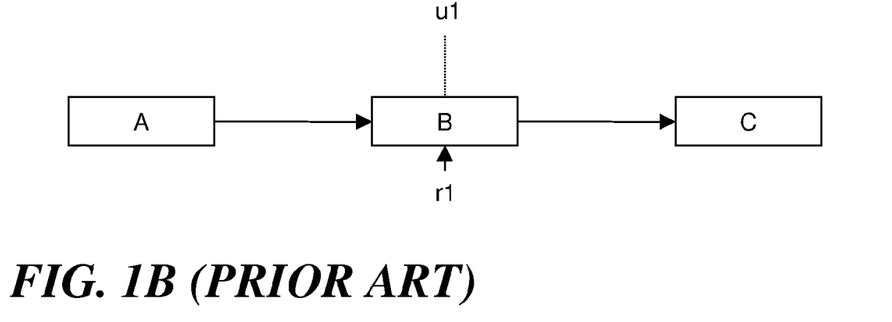
Figure 1C:
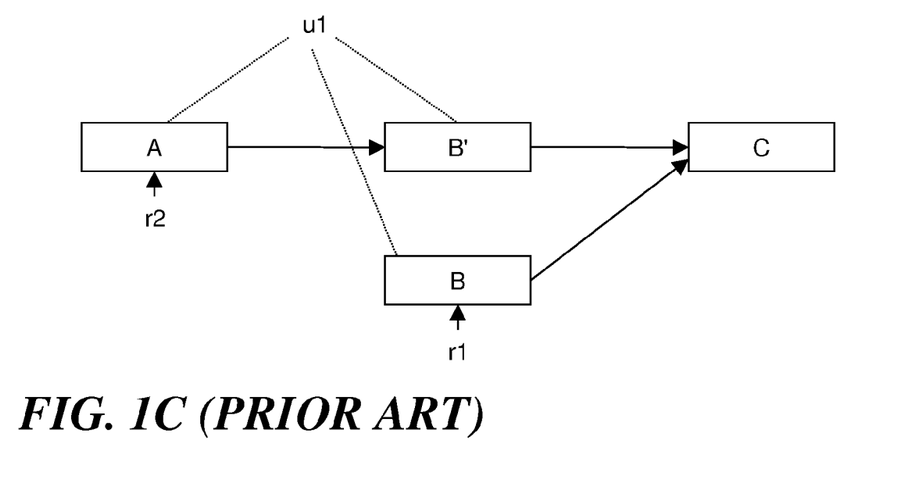

It is assumed that the data element list of FIGS. 1A-1D is traversed (without locking) by multiple concurrent readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock, allocating new memory for B', copying the contents of B to B', modifying B' as needed, updating the pointer from A to B so that it points to B', and releasing the lock. All subsequent (post update) readers that traverse the linked list, such as the reader r2, will see the effect of the update operation by encountering B'. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays.

Figure 1D:
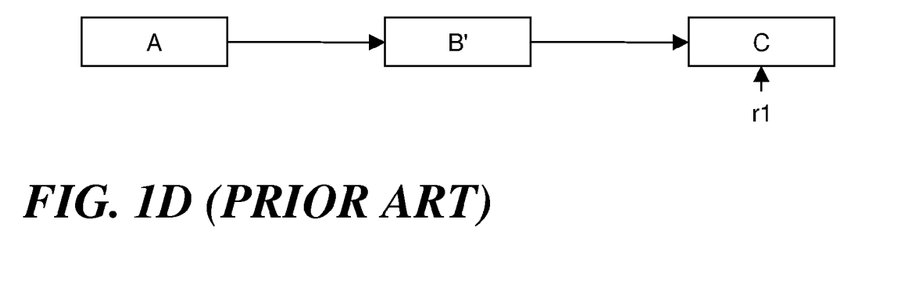

At some subsequent time following the update, r1 will have continued its traversal of the linked list and moved its reference off of B. In addition, there will be a time at which no other reader process is entitled to access B. It is at this point, representing expiration of the grace period referred to above, that u1 can free B, as shown in FIG. 1D.

Figure 2A:
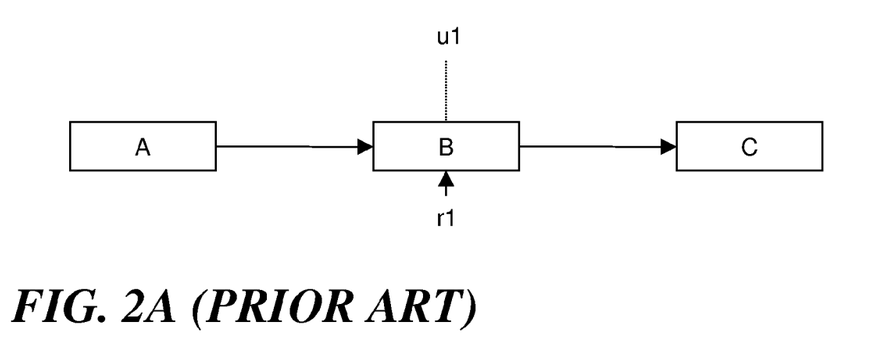
FIGS. 2A-2C are diagrammatic representations of a linked list of data elements undergoing a data element deletion according to a conventional read-copy update mechanism.
Figure 2B:
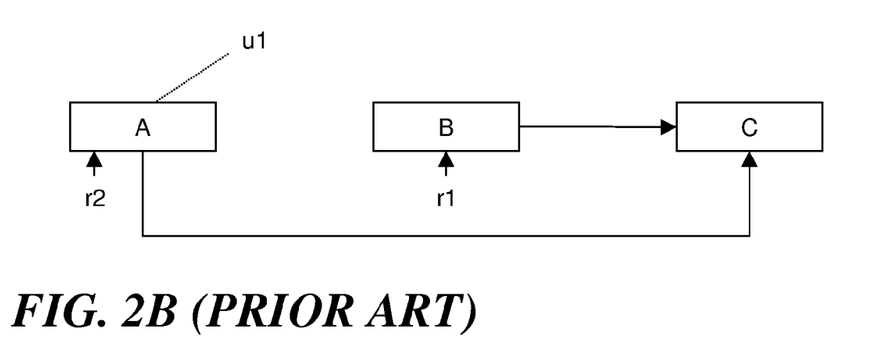
Figure 2C:
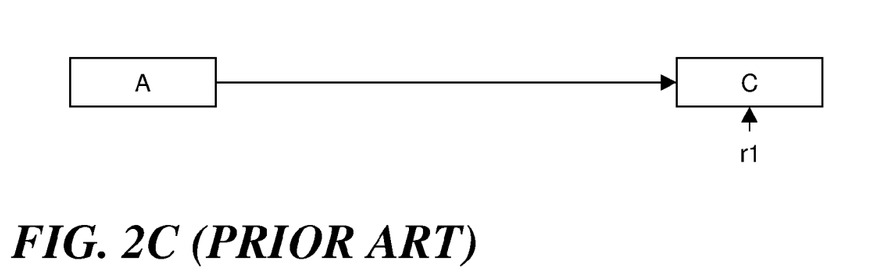

FIGS. 2A-2C illustrate the use of read-copy update to delete a data element B in a singly-linked list of data elements A, B and C. As shown in FIG. 2A, a reader r1 is assumed to be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following expiration of the grace period.

In the context of the read-copy update mechanism, a grace period represents the point at which all running processes having access to a data element guarded by read-copy update have passed through a "quiescent state" in which they can no longer maintain references to the data element, assert locks thereon, or make any assumptions about data element state. By convention, for operating system kernel code paths, a context (process) switch, an idle loop, and user mode execution all represent quiescent states for any given CPU (as can other operations that will not be listed here).

Figure 3:
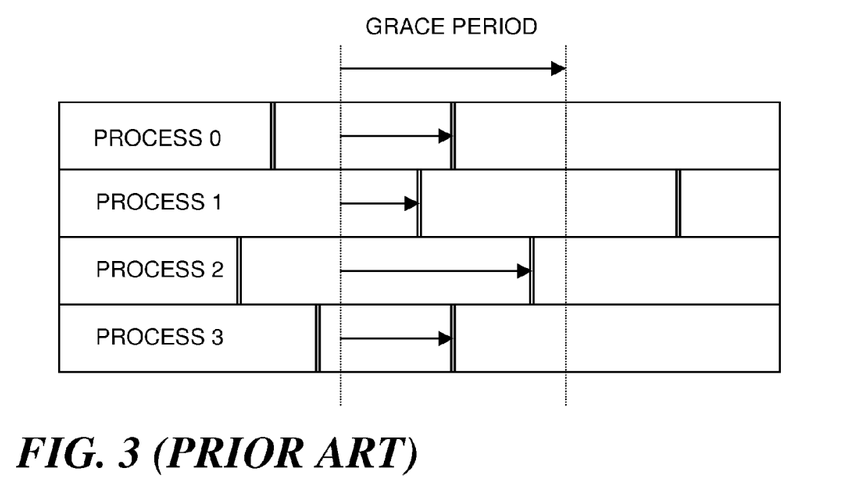
FIG. 3 is a flow diagram illustrating a grace period in which four processes pass through a quiescent state.

In FIG. 3, four processes 0, 1, 2, and 3 running on four separate CPUs are shown to pass periodically through quiescent states (represented by the double vertical bars). The grace period (shown by the dotted vertical lines) encompasses the time frame in which all four processes have passed through one quiescent state. If the four processes 0, 1, 2, and 3 were reader processes traversing the linked lists of FIGS. 1A-1D or FIGS. 2A-2C, none of these processes having reference to the old data element B prior to the grace period could maintain a reference thereto following the grace period. All post grace period searches conducted by these processes would bypass B by following the links inserted by the updater.

There are various methods that may be used to implement a deferred RCU second-phase data update following a grace period, including but not limited to the use of callback processing as described in commonly assigned U.S. Pat. No. 5,727,209, entitled "Apparatus And Method For Achieving Reduced Overhead Mutual-Exclusion And Maintaining Coherency In A Multiprocessor System Utilizing Execution History And Thread Monitoring." Another commonly used technique is to have updaters block (wait) until a grace period has completed. It should also be understood that RCU second-phase update processing may comprise actions other than freeing stale data elements. For example, a data element being updated using RCU may correspond to an operational state. In that case, the RCU second-phase data update action may comprise changing an operational state following a grace period.

Read-copy update has been used in production for many years in various operating system kernel environments, including the Linux® kernel. Multithreaded user-level (a.k.a. user-mode) application programming provides an opportunity to use read-copy update for user-level environments. Although there have been user-level implementations of RCU, these implementations place constraints on the design of the user-level application that are often intolerable in practice. Examples of such constraints include (1) requiring well-defined or special quiescent states, (2) disabling of preemption and/or interrupts, and (3) periodic interrupt, signal and/or exception processing.

An example of constraint (1) is found in a prior art user-level RCU implementation that relies on the grace period detection machinery being called periodically from a quiescent state. Without an explicitly defined quiescent state, a library function using RCU might have no idea where a quiescent state might be for the various applications running in the system. The RCU library function would need to operate correctly regardless of the design of the application calling function.

Constraint (2) is needed when an RCU reader is in the process of registering for RCU critical section processing (e.g., by incrementing or decrementing a counter that is checked during grace period detection). Otherwise, the RCU reader could be disrupted at this point due to being preempted or interrupted by preempting code that then also attempts to register for RCU critical section in competition with the RCU reader (e.g., by incrementing or decrementing the same counter). In user mode, such preempting code would be a signal handler for the RCU reader application, and disabling signal handling is very expensive on many systems. Moreover, persons skilled in the art will also recognize that upcalls, notifications, and asynchronous system traps (ASTs) (e.g., in VMS/VAX systems) may also be handled similarly to signals.

Constraint (3) includes interrupt and signal processing used to coordinate RCU reader operations with grace period detection operations by executing grace period detection code on behalf of each application that has an RCU reader. This is analogous to the grace period detection state machine used in RCU implementations for preemptible operating system kernels, where grace period detection processing is periodically executed on each CPU to coordinate with RCU readers. Constraint (3) also includes exception processing of the type described in commonly owned U.S. Patent Application Publication No. 2006/0130061. This publication discloses an RCU implementation that supports user-level operation by running an exception handler to determine if reader roll-back (and critical section reprocessing) is required for a preempted thread having an RCU critical section following a return from preemption. This recovery mechanism allows thread preemption to be considered a quiescent state, but also requires non-standard kernel modifications on most modern operating systems.

Accordingly, there is a need for a user-level implementation of read-copy update that does not place such onerous restrictions on application design.

SUMMARY OF THE INVENTION

A method, system and computer program product for implementing an improved user-level read-copy update (RCU) technique. A user-level RCU subsystem executes within threads of a user-level multithreaded application. The multithreaded application may include reader threads that read RCU-protected data elements in a shared memory and updater threads that update such data elements. The reader and updater threads may be preemptible and comprise signal handlers that process signals. Reader registration and unregistration components in the RCU subsystem respectively register and unregister the reader threads for RCU critical section processing. These operations are performed while the reader threads remain preemptible and with their signal handlers being operational. A grace period detection component in the RCU subsystem considers a registration status of the reader threads and determines when it is safe to perform RCU second-phase update processing to, for example, remove stale versions of updated data elements that are being referenced by the reader threads, or take other RCU second-phase update processing actions.

BRIEF DESCRIPTION OF THE DRAWINGS

The foregoing and other features and advantages of the invention will be apparent from the following more particular description of example embodiments, as illustrated in the accompanying Drawings, in which.

DETAILED DESCRIPTION OF EXAMPLE EMBODIMENTS

Figure 4:
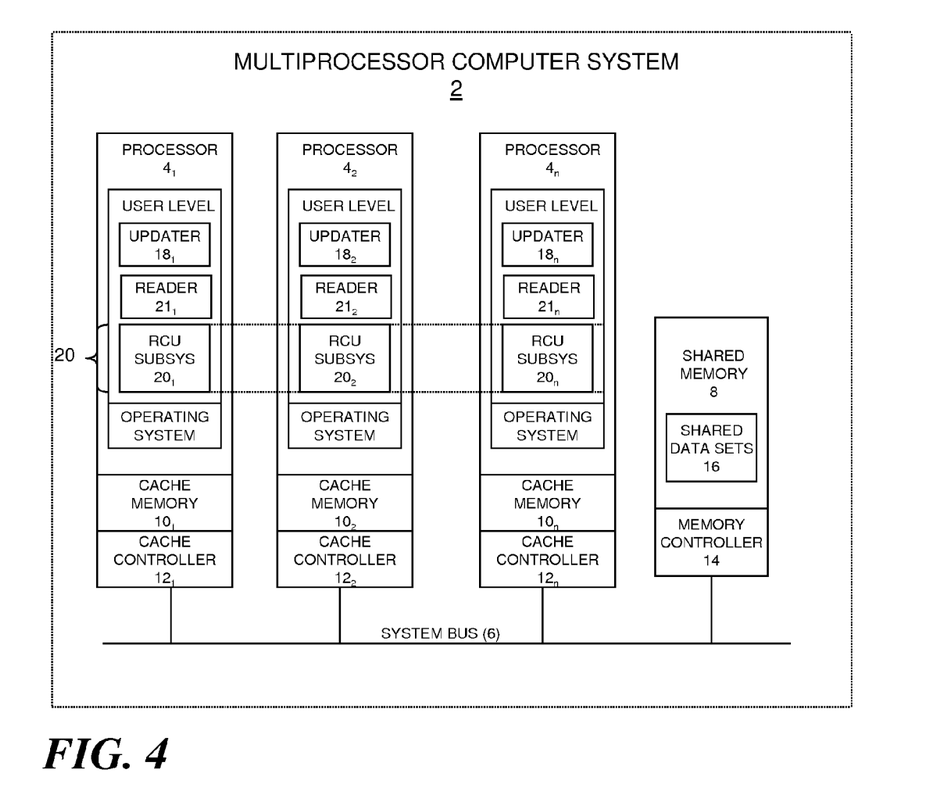
FIG. 4 is a functional block diagram showing a multiprocessor computing system that represents an example environment in which the present invention can be implemented.

Turning now to the figures, wherein like reference numerals represent like elements in all of the several views, FIG. 4 illustrates an example computing environment in which the present invention may be implemented. In particular, a symmetrical multiprocessor (SMP) computing system 2 is shown in which multiple processors $4_1, 4_2 \ldots 4_n$ are connected by way of a common bus 6 to a shared memory 8. Respectively associated with each processor $4_1, 4_2 \ldots 4_n$ is a conventional cache memory $10_1, 10_2 \ldots 10_n$ and a cache controller $12_1, 12_2 \ldots 12_n$. A conventional memory controller 14 is associated with the shared memory 8. The computing system 2 is assumed to be under the management of a multitasking operating system adapted for use in an SMP environment.

Figure 5:
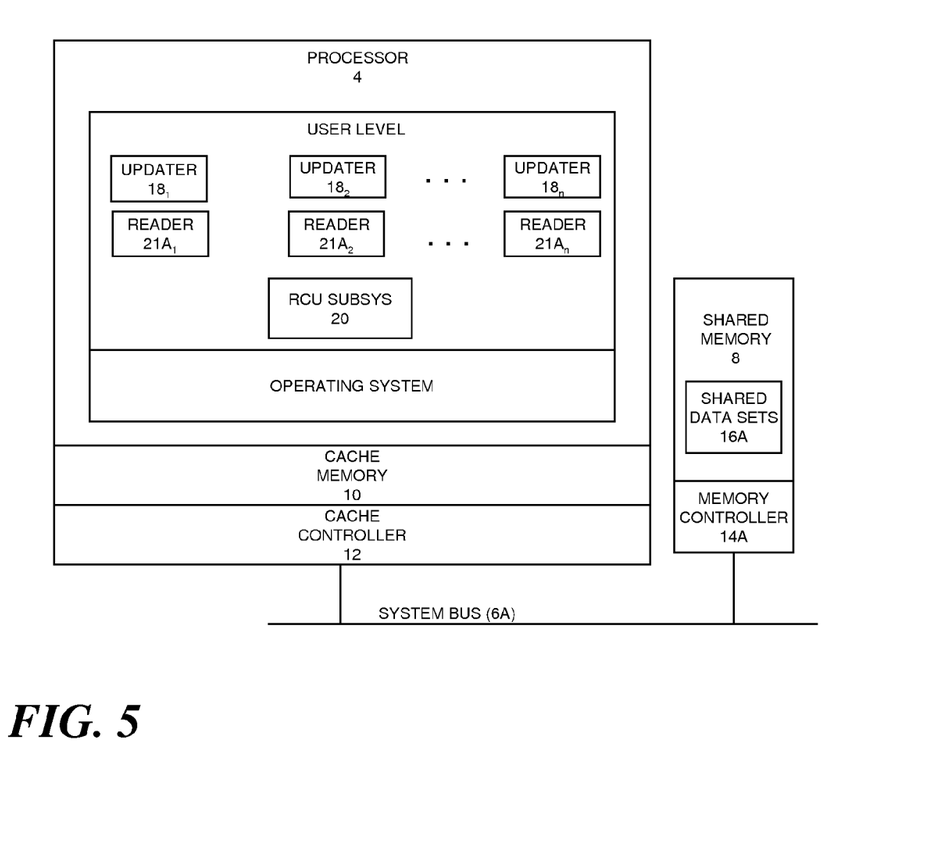
FIG. 5 is a functional block diagram showing a single processor that could be used in the multiprocessor computing system of FIG. 4, or as the sole processor of a uniprocessor system.

It is further assumed in FIG. 4 that update operations executed within a user-level threads (or other user-level execution contexts) will periodically perform updates on a set of shared data 16 stored in the shared memory 8. Reference numerals $18_1, 18_2 \ldots 18_n$ illustrate individual user-level data update operations (updaters) that may periodically execute on the several processors $4_1, 4_2 \ldots 4_n$. Alternatively, as shown in FIG. 5, the updaters $18_1, 18_2 \ldots 18_n$ could all run on a single processor 4 that is either part of the multiprocessor computing system 2, or is the sole processor of a uniprocessor computing system. As described by way of background above, the updates performed by the data updaters $18_1, 18_2 \ldots 18_n$ can include modifying elements of a linked list, inserting new elements into the list, deleting elements from the list, and many other types of operations. To facilitate such updates, the several processors $4_1, 4_2 \ldots 4_n$ of FIG. 4, or the single processor 4 of FIG. 5, are programmed to implement a user-level read-copy update (RCU) subsystem 20 as part of their user-level application functions. In FIG. 4, the RCU subsystem 20 comprises RCU instances $20_1, 20_2 \ldots 20_n$ that periodically execute on the several processors $4_1, 4_2 \ldots 4_n$. Each of the processors $4_1, 4_2 \ldots 4_n$ of FIG. 4, or the single processor of FIG. 5, also periodically execute user-level read operations (readers) $21_1, 21_2 \ldots 21_n$ on the shared data 16. Such read operations will typically be performed far more often than updates, insofar as this is one of the premises underlying the use of read-copy update.

The updaters, the readers, and the RCU subsystem instances can be implemented as user-level threads within a multithreaded user-level program. As persons skilled in the art will appreciate, multithreaded programming is a form of parallel programming wherein several threads of control (also known as lightweight processes) execute concurrently within a single application program. All threads share the same memory space, and can therefore work concurrently on shared data. The POSIX threads (pthreads) library is one example of such a threads implementation. Multithreading may be implemented using kernel threads with scheduling support being provided by the underlying operating system (e.g., Linux®) or entirely at user level via implementations such as "Green threads."

Read-copy update may be implemented in the environment of FIGS. 4 and 5 using a technique that is somewhat analogous to RCU implementations for preemptible operating system kernels (hereinafter referred to a "preemptible RCU"), but with two distinguishing aspects. In preemptible RCU, readers protect themselves during RCU-protected critical section processing by manipulating per-CPU counters that must be reset before a grace period can expire. Manipulating such counters requires that interrupts be disabled, which also has the effect of preventing preemption. Signal handling represents the user-level analog to disabling interrupts in kernel mode. As described above in the section entitled "Background of the Invention," disabling signal handling in user mode is very expensive, and thus should be avoided when possible. According to one distinguishing aspect of the technique disclosed herein, signal handler disabling by RCU readers is not required.

On the update side, another feature of preemptible RCU is the periodic interleaving of grace period detection execution with RCU reader execution. Such interleaving is utilized to coordinate grace period detection with RCU reader operation, ensuring that the readers are aware of new grace periods and that their critical sections are properly protected against premature removal of critical section data structures. Such interleaved processing is implemented by running the grace period detection code from normal scheduling clock interrupts. The only ways to do this in user mode would be to have grace period detection run in a signal handler or to require that each thread periodically run grace-period detection explicitly. Although one such technique is described as an option below, the use of a signal handling for RCU would deprive applications of the full use of their signal handlers, which may be required for other purposes. An application might also be making full use of its signal handlers, in which case RCU cannot use them. Moreover, it is preferable that RCU not be required to analyze the signal properties of the application. This is especially important when attempting to use RCU in a library function that might be linked to any arbitrary application. If RCU is used in a library function, there would be no way of knowing what the (possibly not-yet-written) application might be doing with its signal handlers. Accordingly, a second distinguishing aspect of the presently disclosed technique is that memory barriers may be used on computer systems with weakly ordered memory models to coordinate RCU read operations with grace period detection operations.

Figure 6:
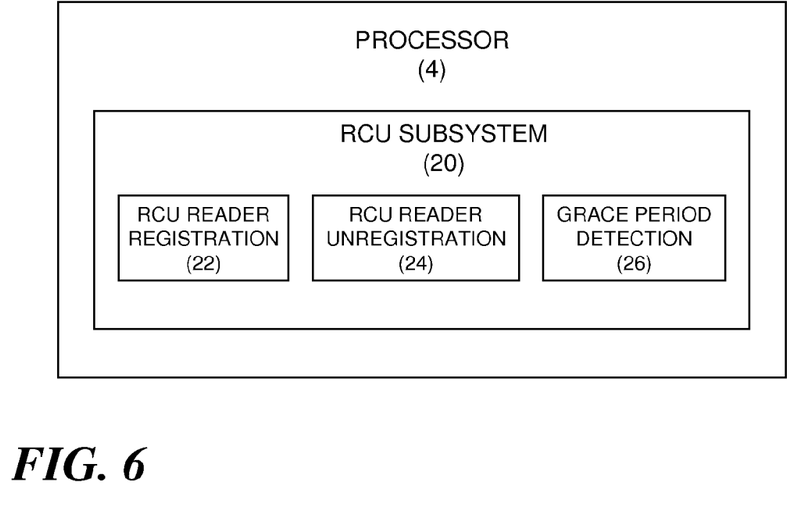
FIG. 6 is a functional block diagram showing a read-copy update subsystem implemented in the computing system of FIG. 4 or in the processor of FIG. 5.
Figure 7:
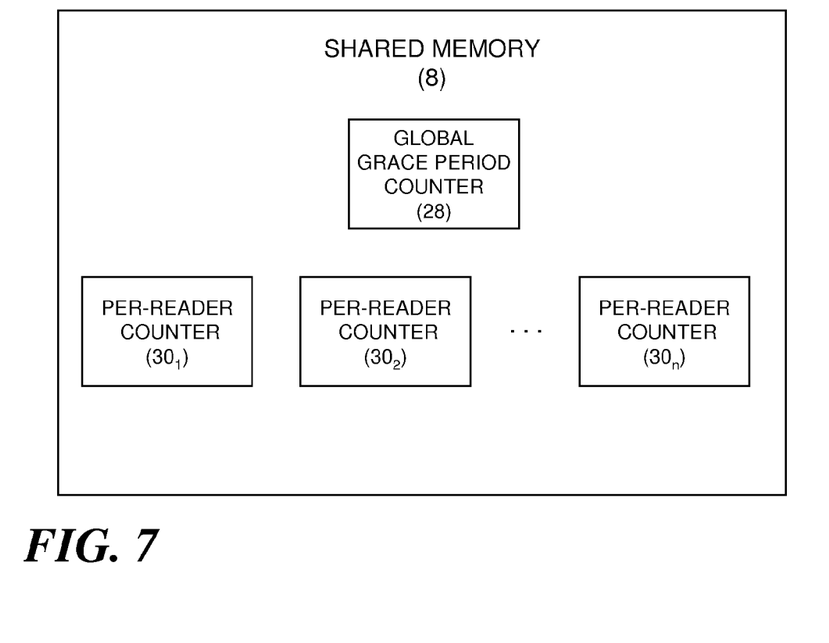
FIG. 7 is a functional block diagram showing global and per-thread variables that may be used by the read-copy update subsystem of FIG. 6.

As shown in FIG. 6, the RCU subsystem 20 includes an RCU reader registration component 22, an RCU reader unregistration component 24 and a grace period detection component 26. These components can be implemented in any suitable fashion, including within the readers and updaters themselves, or as library functions in a user-level library such as the POSIX threads library. As shown in FIG. 7, the RCU subsystem 20 may be implemented using a global grace period counter 28 manipulated by the grace period detection component 26. The RCU subsystem 20 may be further implemented using a set of per-reader grace period counters $30_1, 30_2 \ldots 30_n$ manipulated by the reader registration component 22 and the reader unregistration component 24. The global grace period counter 28 can be a global (or local) variable stored in the shared memory 8. The per-reader counters $30_1, 30_2 \ldots 30_n$ can be local per-reader variables stored in a data structure (e.g., a data structure mapping from POSIX pthread_id to corresponding per-thread variables) associated with the readers $21_1, 21_2 \ldots 21_n$, or in per-thread variables in thread local storage if such are provided by the multithreading implementation. In either case, a given thread's per-thread variables must be accessible from other threads.

The reader registration/unregistration components 22 and 24 allow the readers $21_1, 21_2 \ldots 21_n$ to advise the RCU subsystem 20 whenever they respectively enter or leave an RCU critical section. Because the readers $21_1, 21_2 \ldots 21_n$, are user-level entities, they are subject to preemption. Using a context switch as a quiescent state per conventional (non-preemptible) RCU is therefore not feasible. Preempting a reader $21_1, 21_2 \ldots 21_n$ would represent a context switch but could occur even while the reader is in an RCU critical section referencing elements of the shared data 16 (shared data elements). The reader registration/unregistration components 22 and 24 solve this problem by using a technique analogous to that used in preemptible RCU implementations, wherein (as mentioned above) readers respectively register and unregister themselves for RCU critical section processing. Any reader $21_1, 21_2 \ldots 21_n$ that is not currently registered with the RCU subsystem 20 is considered to be in a quiescent state. In addition, any reader that entered its RCU critical section after the beginning of the current grace period is likewise considered to be in a quiescent state relative to data element updates implemented in a previous grace period.

A user-level version of the preemptible RCU primitive known as "rcu_read_lock( )" may be used as the reader registration component 22. Details of how this primitive can be implemented are described in more detail below. The registration component 22 is called by a reader $21_1, 21_2 \ldots 21_n$ when it needs to enter an RCU critical section. The registration component 22 registers the reader $21_1$, $21_2$ ... $21_n$ with the RCU subsystem 20 by manipulating the per-reader counter $30_1$, $30_2$ ... $30_n$ associated with the calling reader. The per-reader counter $30_1$, $30_2$ ... $30_n$ is manipulated to a value that signifies to the grace period detection component 26 whether the reader $21_1$, $21_2$ ... $21_n$ is engaged in critical section processing relative to a particular grace period. Example per-reader counter manipulation techniques are described in more detail below.

Unlike preemptible RCU, the user-level rcu_read_lock( ) primitive does not disable preemption or interrupts in order to manipulate the counters $30_1$, $30_2$ ... $30_n$. This is done in preemptible RCU (wherein readers manipulate per-CPU counters) to prevent an interrupt handler or other preempting task that uses RCU from manipulating the same counter that the preempted reader was manipulating, possibly resulting in the counter being in an improper state when the preempted reader is reinstated. As previously mentioned, for user-level applications, such disabling would entail disabling signal handling, which is undesirable. Instead, one way that user-level RCU may be implemented is to put a constraint in place that signal handlers are not permitted to perform RCU read operations (and thus do not have an opportunity to manipulate the per-reader counters $30_1$, $30_2$ ... $30_n$). In this way, signal handling does not have to be disabled within the user-level rcu_read_lock( ) primitive. An alternative approach that allows signal handlers to use RCU would account for nested RCU readers. This alternative is described in more detail below.

Another factor that allows reader signal handling to remain active in the present user-level RCU implementation is that each reader has its own per-reader counter $30_1$, $30_2$ ... $30_n$ (instead of using per-CPU counters as in preemptible RCU). This means that there is no opportunity for preempted readers to have their counters manipulated by preempting readers that vie for the same counter. The preempting readers would use their own per-reader counters $30_1$, $30_2$ ... $30_n$ and thus would have no opportunity to corrupt the per-reader counter of the reader being preempted.

After the registration component 22 manipulates its reader's per-reader counter $30_1$, $30_2$ ... $30_n$, it implements a memory barrier instruction. This ensures that the grace period detection component 26 will see the manipulation of the per-reader counter $30_1$, $30_2$ ... $30_n$ prior to the reader $21_1$, $21_2$ ... $21_n$ performing critical section processing. As explained above, this further differentiates the user-level rcu_read_lock( ) primitive from its preemptible RCU counterpart, and obviates the need to interleave execution of the grace period detection component 26 with execution of the readers $21_1$, $21_2$ ... $21_n$. This also obviates the need for (expensive) atomic-instructions.

A user-level version of the preemptible RCU primitive known as "rcu_read_unlock( )" may be used as the reader unregistration component 24. Details of how this primitive can be implemented are described in more detail below. The unregistration component 24 is called by a reader $21_1$, $21_2$ ... $21_n$ after it has completed an RCU critical section. The unregistration component 24 unregisters the reader $21_1$, $21_2$ ... $21_n$ from the RCU subsystem by manipulating the per-reader counter $30_1$, $30_2$ ... $30_n$ associated with the calling reader to a value that signifies to the grace period detection component 26 that critical section processing has completed. Unlike preemptible RCU, the user-level rcu_read_unlock( ) primitive does not disable preemption or interrupts in order to manipulate the counters $30_1$, $30_2$ ... $30_n$. A further distinction is that the user-level rcu_read_unlock( ) primitive executes a memory barrier instruction prior to manipulating the counter reader $30_1$, $30_2$ ... $30_n$. This ensures that the grace period detection component 26 will see the counter manipulation only after the reader $21_1$, $21_2$ ... $21_n$ completes critical section processing. As explained above, this obviates the need to interleave execution of the grace period detection component 26 with execution of the readers $21_1$, $21_2$ ... $21_n$, and also obviates the need for (expensive) atomic instructions.

Figure 8:
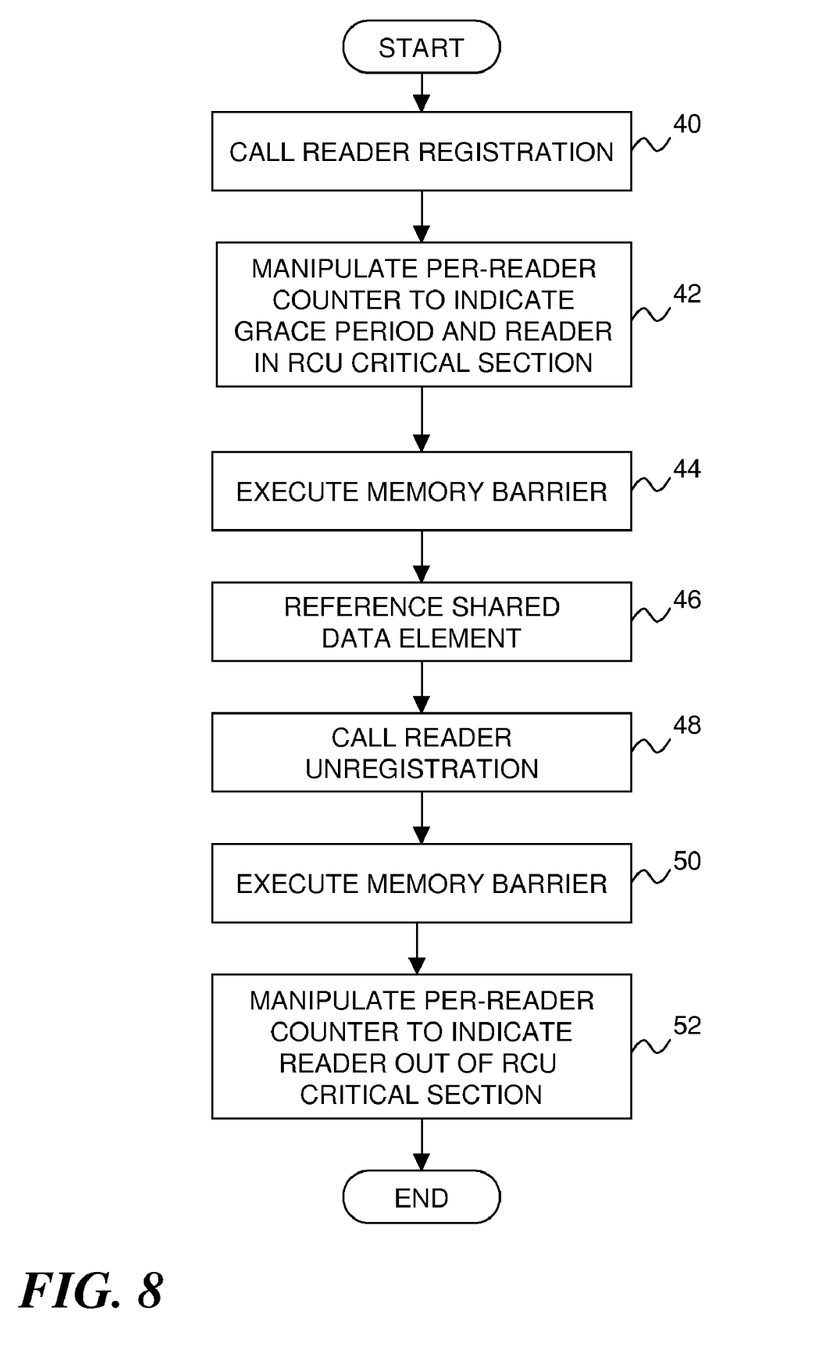
FIG. 8 is a flow diagram showing read processing that may be performed by the read-copy update subsystem of FIG. 6.

FIG. 8 illustrates an example of how RCU read-side processing may be performed by a reader $21_1$, $21_2$ ... $21_n$ using the registration/registration components 22 and 24. In block 40 the reader $21_1$, $21_2$ ... $21_n$ calls user the reader registration component 22 (e.g., the user-level rcu_read_lock( ) primitive) prior to entering its RCU critical section. In block 42, the reader registration component 22 manipulates the reader's per-reader counter $30_1$, $30_2$ ... $30_n$ to signify to the grace period detection component 26 that the reader $21_1$, $21_2$ ... $21_n$ is performing RCU critical section processing. The counter value is also set in a manner that indicates the current grace period (to which the reader $21_1$, $21_2$ ... $21_n$ is assigned). In block 44, the reader registration component 22 executes its memory barrier instruction to order the read-side processing. In block 46, the reader $21_1$, $21_2$ ... $21_n$ performs its RCU critical section processing by referencing a shared data element 16. In block 48, the reader $21_1$, $21_2$ ... $21_n$ calls the reader unregistration component 24 (e.g., the user-level rcu_read_unlock( ) primitive) upon leaving the RCU critical section. In block 50, the unregistration component 24 executes its memory barrier instruction. In block 52, the unregistration component 24 manipulates the reader's per-reader counter $30_1$, $30_2$ ... $30_n$ to signify to the grace period detection component 26 that the reader's RCU critical section processing has completed.

A user-level version of an RCU primitive known as "synchronize_rcu( )" may be used to implement the grace period detection component 26. Like its conventional (non-preemptible) RCU counterpart, this primitive performs synchronous grace period detection when called by an updater $18_1$, $18_2$ ... $18_n$ after an update to a shared data element 16. The user-level synchronize_rcu( ) primitive causes the updater $18_1$, $18_2$ ... $18_n$ to block while waiting for the readers $21_1$, $21_2$ ... $21_n$ to enter quiescent states, then allows the updater to proceed with performing a deferred free of any stale data element resulting from an update to the shared data elements 16.

Figure 9:
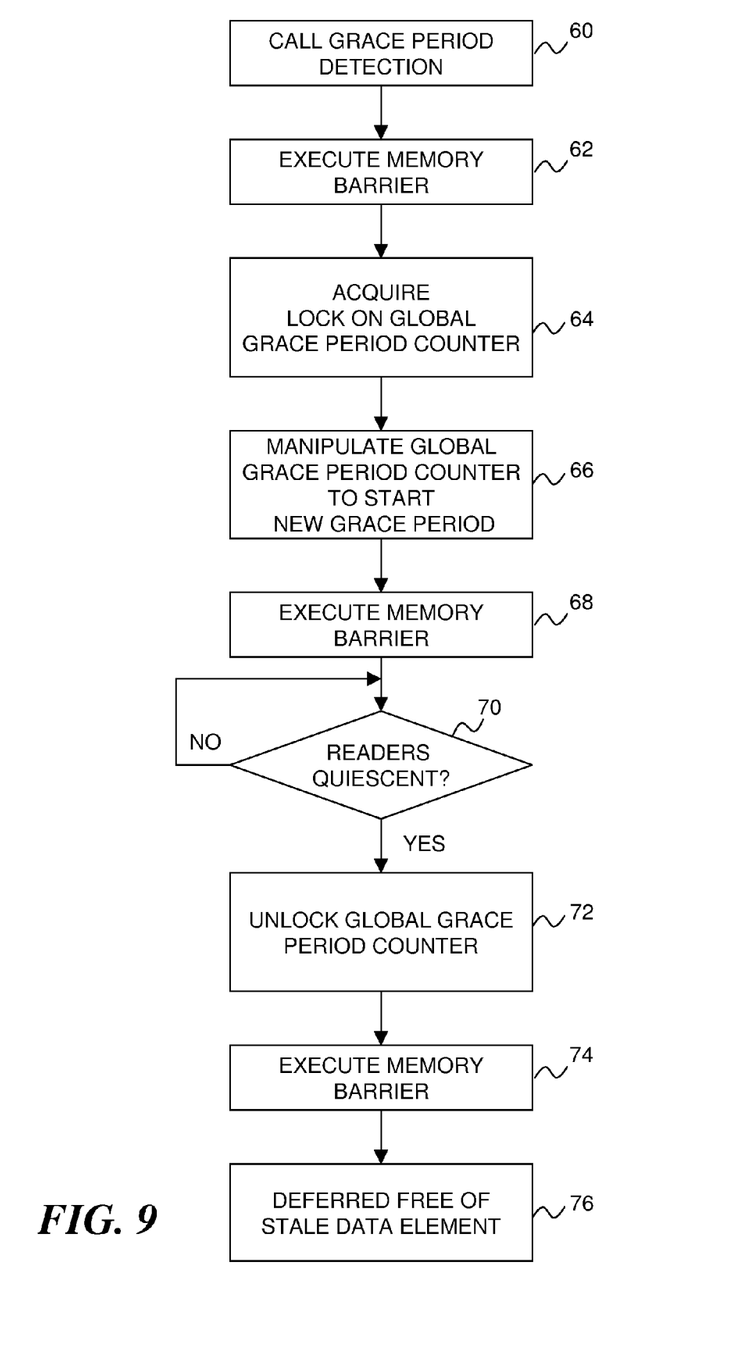
FIG. 9 is a flow diagram showing grace period detection processing that may be performed by the read-copy update subsystem of FIG. 6.

FIG. 9 illustrates example grace period detection processing that may be performed by the grace period detection component 26 on behalf of an updater $18_1$, $18_2$ ... $18_n$. In block 60 the updater $18_1$, $18_2$ ... $18_n$ calls user the grace period detection component 26 (e.g., the user-level synchronize_rcu( ) primitive) following a first-phase RCU update to a shared data element 16. As described above in the section entitled "Background of the Invention," the first-phase RCU update operation maintains any necessary pre-update version of the data element 16 that may be currently being referenced by any of readers $21_1$, $21_2$ ... $21_n$. In block 62, the grace period detection component 26 executes a memory barrier instruction to ensure that the data element update performed prior to block 60 is seen by other threads as occurring counter manipulation in block 66 (discussed below). In block 64, the grace period detection component 26 acquires a lock on the global grace period counter 28 to prevent other updater's from manipulating the same variable. In block 66, the grace period detection component 26 manipulates the grace period counter 28 to start a new grace period. In block 68, the grace period detection component 26 executes a memory barrier instruction to ensure that readers $21_1$, $21_2$ ... $21_n$ see the global counter manipulation before checking of the per-reader counters. In block 70, the grace period detection component 26 monitors the per-reader counters $30_1, 30_2 \ldots 30_n$ to determine whether all readers $21_1, 21_2 \ldots 21_n$ are in, or have passed through, a quiescent state. In block 72, the grace period detection component 26 release the lock acquired in block 62. In block 74, the grace period detection component 26 executes a memory barrier to ensure that second-phase RCU update processing is not performed until block 70 is completed. In block 76, the updater $18_1, 18_2 \ldots 18_n$ performs second-phase RCU update processing, for example, by freeing any stale data elements 16 resulting from the update.

Example techniques may now be described for manipulating the global grace period counter 28 and the various per-reader counters $30_1, 30_2 \ldots 30_n$ in order to implement user-level read-copy update. The basic goal is to provide a way for the grace period detection component 26 to determine when it is safe to free stale data elements without affecting any of the readers $21_1, 21_2 \ldots 21_n$. Such deferred update operations may proceed provided that no reader $21_1, 21_2 \ldots 21_n$ in an RCU critical section, or if the readers entered an RCU critical section after the start of the current grace period. In either case, freeing a stale data element associated with an update operation conducted during a previous grace period cannot possibly have an effect on any reader $21_1, 21_2 \ldots 21_n$.

Any reader $21_1, 21_2 \ldots 21_n$ that is not in a critical section is considered to be in a quiescent state and may be safely ignored by grace period detection component. 26. For readers $21_1, 21_2 \ldots 21_n$ that are in a critical section, those that entered their critical section after the beginning of the current grace period may likewise be treated as being in a quiescent state relative to data element updates implemented in a previous grace period. Thus, the general approach is to have each reader $21_1, 21_2 \ldots 21_n$ maintain two items of information about itself, namely: (1) whether or not the reader is in a critical section (per-reader state); and (2) if the reader is in a critical section, the grace period to which the reader belongs (per-reader grace period). Collectively, the per-reader state and the per-reader grace period may be referred to as the registration "status" of a reader $21_1, 21_2 \ldots 21_n$. As will now be described, information items (1) and (2) can be respectively tracked by managing the values of the global grace period counter 28 and the per-reader counters $30_1, 30_2 \ldots 30_n$.

User-Level RCU Mechanism 1

One technique that may be used to support user-level RCU is to initialize the global grace period counter 28 to some starting value (e.g., 0), then have the grace period detection component 26 advance the counter for each new grace period. As an additional constraint, the grace period detection component 26 only advances the global grace period counter 28 in a manner that maintains the counter's divisibility by two (or by some other integer, preferably a power of two). This can be done by advancing the global grace period counter 28 using even numbers (so that the low-order bit is always 0). In this way, the global grace period counter 28 will remain consistently even as it advances, thus establishing a global reference state that the readers $21_1, 21_2 \ldots 21_n$ can use to set their per-reader counters $30_1, 30_2 \ldots 30_n$ to indicate per-reader state. For example, the global counter 28 may be initialized to 0, then incremented by 2 for each grace period, such that its value advances as follows: (0, 2, 4, 6, 8, 10 ... n), where n is an even number.

The reader registration component 22 may assign its reader $21_1, 21_2 \ldots 21_n$ to a grace period by copying the current value of the global grace period counter 28 to the reader's per-reader counter $30_1, 30_2 \ldots 30_n$. As part of the same operation, the reader registration component 22 may indicate that its reader $21_1, 21_2 \ldots 21_n$ is in a critical section by incrementing the value of the per-reader counter $30_1, 30_2 \ldots 30_n$ in a manner that sets the per-reader state to be different than the global reference state. If the global reference state is represented by maintaining an even value (i.e., low-order bit=0), this will require that the incrementation interval be an odd number (i.e., low-order bit=1). Thus, if the global grace period counter 28 is advanced by 2 for each grace period, the reader registration component 22 could advance the reader's per-reader counter $30_1, 30_2 \ldots 30_n$ by 1. The reader unregistration component 22 may thereafter reset the per-reader counter $30_1, 30_2 \ldots 30_n$ to signify that its reader $21_1, 21_2 \ldots 21_n$ has completed grace period processing, such as by setting the per-reader counter equal to the current value of the global grace period counter 28. This will have the effect of changing the per-reader state back to the global reference state. Alternatively, the reader unregistration component 22 could simply decrement the per-reader counter $30_1, 30_2 \ldots 30_n$ to change the low-order bit, again resetting the per-reader state back to the global reference state.

The grace period detection component 26 may implement grace period processing by advancing the global grace period counter 28 while maintaining the divisibility by two (e.g., even values), then comparing the global counter to the per-reader counters $30_1, 30_2 \ldots 30_n$ to determine reader status. If the per-reader counter's low-order bit is the same as that of the global counter, the reader $21_1, 21_2 \ldots 21_n$ is not in a critical section and may be ignored. On the other hand, if the per-reader counter's low-order bit differs from that of the global grace period counter 28, the per-reader state of the associated reader $21_1, 21_2 \ldots 21_n$ is different from the global reference state and the reader is therefore deemed to be in a critical section. If the reader $21_1, 21_2 \ldots 21_n$ is in a critical section but the per-reader counter value is not less than the global counter value, the reader $21_1, 21_2 \ldots 21_n$ is aware of the new grace period and the reader's status is such that it may be ignored. If the reader $21_1, 21_2 \ldots 21_n$ is in a critical section and the per-reader counter value is less than the value of the global grace period counter 28, the associated reader $21_1, 21_2 \ldots 21_n$ is in a critical section that was entered into during a previous period. The status of the reader $21_1, 21_2 \ldots 21_n$ is such that the grace period detection component 26 must wait until the reader completes its critical section processing.

Based on the foregoing example, a pseudo-code representation of the reader registration component 22 might appear as follows:

```
rcu_read_lock( )
{
    get_thread_var(per_reader_counter) = global_counter + 1;
    memory_barrier( );
}
```

Based on the foregoing example, a pseudo-code representation of the reader unregistration component 24 might appear as follows:

```
rcu_read_unlock( )
{
    memory_barrier( );
    get_thread_var(per_reader_counter) = global_counter;
}
```

Based on the foregoing example, a pseudo-code representation of the grace period detection component 26 might appear as follows:

```
synchronize_rcu( )
{
    memory_barrier( );
    spin_lock(&global_counter_lock);
    global_counter += 2;
    memory_barrier( );
    for_each_reader_thread ( ) {
        while ((per_reader_counter & 0x1) &&
            (per_reader_counter – global_counter < 0)) {
        }
    }
    spin_unlock(&global_counter_lock);
    memory_barrier( );
}
```

User-Level RCU Mechanism 2

A variation on the foregoing technique may be used on processors with large registers (e.g., 64 bit) to eliminate the two-condition "while" loop that determines reader status in the synchronize_rcu( ) pseudo-code shown above. Instead of initializing the global grace period counter 28 to a low value and incrementing by an even number to maintain divisibility by two, the global counter is initialized to the largest positive number and the grace period detection component 26 decrements the counter (e.g., by 1 or more) for each grace period. The decrement value is preferably the smallest possible value (e.g., 1) to avoid the possibility of the global grace period counter 28 decreasing to zero during the maximum reasonable system up-time. The reader registration component 22 sets the reader's per-reader counter $30_1$, $30_2$ ... $30_n$ to the value of the global grace period counter 28. However, instead of using the low order bit of the per-reader counter $30_1$, $30_2$ ... $30_n$ to indicate that a reader $21_1$, $21_2$ ... $21_n$ is in a critical section, the reader registration component 22 negates the number. The sign bit of the number thus indicates the per-reader state, with a negative sign bit indicating critical section processing and a positive sign indicating the global reference state. The reader unregistration component 24 thereafter reverses this operation by either acquiring the current value of the global grace period counter 28, or by negating the per-reader counter $30_1$, $30_2$ ... $30_n$ back to positive. In either case, the sign of the per-reader counter $30_1$, $30_2$ ... $30_n$ will be set to correspond to the global reference state. The grace period detection component 26 may then determine reader status from the per-reader counter $30_1$, $30_2$ ... $30_n$ according to following three regimes:

1. Positive numbers—the reader $21_1$, $21_2$ ... $21_n$ is not in an RCU critical section, so can be ignored;

2. Negative numbers that are equal to or greater than the negation of the current value of the global grace period counter 28—the reader $21_1$, $21_2$ ... $21_n$ entered its RCU critical section after current grace period started, so can be ignored; and 3. Negative numbers that are less than the negation of the current grace period global counter 28—the reader $21_1$, $21_2$ ... $21_n$ entered its RCU read-side critical section before the current grace period started, and the updater $18_1$, $18_2$ ... $18_n$ must therefore wait for the reader to complete the critical section.

Thus, the grace period detection component 26 may use a simple signed comparison to determine reader status. If the per-thread counter $30_1$, $30_2$ ... $30_n$ is greater than or equal to the negative of the current global counter 28, then the corresponding thread may be ignored, otherwise the grace period detection component must wait on the reader $21_1$, $21_2$ ... $21_n$.

Based on the foregoing example, a pseudo-code representation of the reader registration component 22 might appear as follows:

```
rcu_read_lock( )
{
    get_thread_var(per_reader_counter) = –global_counter;
    memory_barrier( );
}
```

Based on the foregoing example, a pseudo-code representation of the reader unregistration component 24 might appear as follows:

```
rcu_read_unlock( )
{
    memory_barrier( );
    get_thread_var(per_reader_counter) = global_counter;
}
```

Based on the foregoing example, a pseudo-code representation of the grace period detection component 26 might appear as follows:

```
synchronize_rcu( )
{
    memory_barrier( );
    spin_lock(&global_counter_lock);
    global_counter --;
    memory_barrier( );
    for_each_reader_thread ( ) {
        while (per_reader_counter < –global_counter) {
        }
    }
    spin_unlock(&global_counter_lock);
    memory_barrier( );
}
```

User-Level RCU Mechanism 3

A further variation on the foregoing technique would be to base the values of the global grace period counter 28 and the per-reader counters $30_1$, $30_2$ ... $30_n$ on a varying external reference, such as a timestamp, while also maintaining divisibility by two in order to indicate state. In order to advance a grace period, the grace period detection component 26 would set the global grace period counter 28 equal to the current timestamp value. The initial state of the global grace period counter 28 could be set to establish the global reference state by manipulating the counter's low-order bit to either 1 (for odd numbers) or 0 (for even numbers).

The reader registration component 22 may assign its reader $21_1$, $21_2$ ... $21_n$ to a grace period by setting the reader's per-reader counter $30_1$, $30_2$ ... $30_n$ equal to the current timestamp, but with the low-order set to a per-reader state that indicates critical section processing is underway. For example, if the low-order bit of the global grace period counter 28 is always 0 (even), the low-order bit of the per-reader counter $30_1$, $30_2$ ... $30_n$ could be set to 1 (odd). Note that because the reader grace period is determined by the timestamp value rather than the global grace period counter 28, the latter can be a local variable instead of a global variable. The reader unregistration component 22 may thereafter reset the per-reader counter $30_1$, $30_2$ ... $30_n$ to the current timestamp value while setting the low-order bit to zero to restore the per-reader state to the global reference state. Alternatively, the reader unregistration component 22 could simply reset the low-order bit of the per-reader counter $30_1$, $30_2 \ldots 30_n$ to correspond to the global reference state.

The grace period detection component 26 may implement grace period processing by advancing the global grace period counter 28 using the timestamp/low-order-bit-setting technique described above, then comparing the global counter to the per-reader counters $30_1, 30_2 \ldots 30_n$ to determine reader status. The comparison may be the same as per User-Level RCU Mechanism 1, described above.

Based on the foregoing example, a pseudo-code representation of the reader registration component 22 might appear as follows:

```
rcu_read_lock( )
{
    get_thread_var(per_reader_counter) = get_timestamp( ) | 0x1;
    memory_barrier( );
}
```

Based on the foregoing example, a pseudo-code representation of the reader unregistration component 24 might appear as follows:

```
rcu_read_unlock( )
{
    memory_barrier( );
    get_thread_var(per_reader_counter) = get_timestamp( ) & ~0x1;
}
```

Based on the foregoing example, a pseudo-code representation of the grace period detection component 26 might appear as follows:

```
synchronize_rcu( )
{
    memory_barrier( );
    spin_lock(&global_counter_lock);
    global_counter = get_timestamp( ) & ~0x1;
    memory_barrier( );
    for_each_reader_thread ( ) {
        while ((per_reader_counter & 0x1) &&
            (per_reader_counter – global_counter < 0)) {
            }
    }
    spin_unlock(&global_counter_lock);
    memory_barrier( );
}
```

Implementation Alternatives/Embellishments

Following are a list of features of user-level read-copy update that may be modified according to design preferences:
1. Use POSIX signals in lieu of memory barriers in the above-described primitives—Each reader $21_1, 21_2 \ldots 21_n$ could take a periodic signal. The reader's signal handler would analyze the per-reader counter $30_1, 30_2 \ldots 30_n$ in much the same way that synchronize_rcu( ) does in the foregoing examples. If this analysis indicated that the reader either (1) is not in an RCU read-side critical section or (2) is in an RCU critical section that started after the current grace period started, then it would (for example) clear a per-thread bit. The synchronize_rcu( ) implementation would (1) increment the global grace period counter 28, (2) set all the per-thread bits, and (3) wait for all the per-thread bits to become clear. The signal handler would be analogous to the scheduling-clock-interrupt handler for preemptible RCU.
2. In lieu of prohibiting the above-described primitives from being invoked from a signal handler, this restriction can be eased for applications that require it. Consider the following sequence of events:
   a. thread 0 invokes rcu_read_lock( ), setting its per-reader counter $30_1, 30_2 \ldots 30_n$ appropriately;
   b. thread 0 enters its RCU critical section, and commences accessing RCU-protected data elements;
   c. thread 1 invokes synchronize_rcu( ), incrementing the global grace period counter 28;
   d. thread 0 enters a signal handler, which invokes rcu_read_lock( ), setting its per-reader counter $30_1, 30_2 \ldots 30_n$ appropriately, but overwriting that in step a;
   e. thread 1 notices that thread 0 started its RCU critical section after the beginning of the current grace period, so proceeds;
   f. thread 1 reclaims memory;
   g. thread 0 exits its signal handler, having presumably also done an rcu_read_unlock( );
   h. thread 0 continues in its base-level RCU critical section, and is fatally disappointed to learn that the RCU-protected data structures that it accessed in step b have since been reclaimed by thread 1.

One way to handle this would be to use a nesting count as in preemptible RCU. The nesting count could be embedded into the per-reader counter $30_1, 30_2 \ldots 30_n$. For example, the lower 7 bits of the per-reader counter $30_1, 30_2 \ldots 30_n$ could be used to embed a nesting count (thereby allowing 127 nested read operations). The nest count bits could also be used to indicate the per-reader state, as by interpreting the setting of any of the nest count bits as a non-global reference state indicating RCU critical section processing). The $8^{th}$ and higher bits would hold the reader grace period value. The original reader's rcu_read_lock( ) (the outermost reader) would increment the per-reader counter $30_1, 30_2 \ldots 30_n$, thereby setting the nesting count to one and simultaneously setting the per-reader state to be different than the global reference state. When the signal handler is invoked, its rcu_read_lock( ) will see that it is nested in the mainline RCU critical section and simply increment the nesting count rather than acquire the global grace period value. The signal handler's rcu_read_unlock( ) primitive would decrement the nesting count. The original reader's rcu_read_unlock( ) primitive's decrement would then zero out the nesting count (thereby resetting the per-reader state to the global reference state to indicate that all RCU critical section processing has completed. The synchronize_rcu( ) primitive could inspect the per-reader counters $30_1, 30_2 \ldots 30_n$ to check the per-reader grace period number and the nesting count to determine reader status. Readers $21_1, 21_2 \ldots 21_n$ having a non-zero nesting count and belonging to a previous grace period would be deemed to be in RCU critical sections that require synchronize_rcu( ) to wait.
4. The use of a nesting count would also allow RCU critical sections to be nested (e.g., to handle an RCU-protected data structure that references another RCU-protected data structure).
5. Application support for thread-local storage may provide improved performance. In traditional POSIX threads, each thread is limited to the pthread_self( ) function and the thread stack. Using pthread_self( ), each thread must register itself, and the value of its pthread_self( ) is added to a data structure. This means that this data structure must be searched for each rcu_read_lock( ) and rcu_read_unlock( ) in order for synchronize_rcu( ) to find the per-thread state. Thread-local storage is available for some software languages and is a proposed extension to the C/C++ standard. Such storage allows threads to have variables that are global in the sense of not being auto variables. Instead, the thread variables are private to threads (each thread gets its own copy) but are accessible to other threads. Thus, the rcu_read_lock( ) and rcu(read_unlock( ) primitives could more easily track the per-reader counters $30_1, 30_2 \ldots 30_n$.

6. No special support for real time operation should be needed given that user-level execution is always preemptible. However, priority boosting per preemptible RCU may be desired in the presence of CPU-bound real-time processes.

7. It may be possible to remove the rcu_read_unlock( ) memory barrier on x86 processors that obey manufacturers' published ordering specifications. However, the memory barrier for rcu_read_lock( ) should not be weakened for current versions of such processors insofar as the corresponding store to the per-reader counter $30_1, 30_2 \ldots 30_n$ should be seen as happening before a reader's processing of its RCU critical section.

8. In cases where there are large numbers of threads (e.g., thousands) running on large numbers of processors (e.g., hundreds), running the synchronize_rcu( ) primitive to scan all of the per-reader counters $30_1, 30_2 \ldots 30_n$ may become relatively inefficient. One advantage of maintaining separate threads is that many concurrent synchronize_rcu( ) requests can be batched. Batching may be performed by using callback queues per conventional RCU asynchronous grace period detection. Another technique would be to have a single grace period detection thread (e.g., a daemon thread) execute the synchronize_rcu( ) primitive and advance a grace period number when the primitive returns. Instead of running their own synchronize_rcu( ) primitive, updaters can run an alternative primitive (which may be called synchronize_rcu_batched( )) that simply checks the grace period number set by the daemon thread. If a specified number of grace periods has expired (e.g., 2) since the updater's first-phase update operation, synchronize_rcu_batched( ) will return and the updater can perform second-phase update processing. Otherwise, synchronize_rcu_batched( ) will keep checking the grace period number.

Checking the per-reader counters $30_1, 30_2 \ldots 30_n$ could be performed hierarchically by the grace period detection thread. Hierarchical grace period detection is disclosed in U.S. Pat. No. 5,442,758 of Slingwine et al. According to this technique, a hierarchical per-thread bitmap data structure maintains a hierarchy of bits. Each bit indicates whether its associated thread has passed through a quiescent state. The lowest level of the hierarchy maintains one bit per thread. The next level up maintains one bit per group of threads, and so on. All bits are preset to a predetermined state, for example, a one-state. When a thread is sensed in a quiescent state, its associated bit is set to a zero-state in the lowest level of the hierarchy. If all bits corresponding to threads in the same group are in a zero-state, the associated group bit in the next higher level is set to a zero-state, and so on until either the top of the hierarchy or a non-zero bit is encountered. This data structure efficiently tracks large numbers of threads. In the context of the present disclosure, hierarchical checking of the per-reader counters $30_1, 30_2 \ldots 30_n$ could be performed by the grace period detection thread, as follows:

a. Sweep the per-reader counters $30_1, 30_2 \ldots 30_n$, building upper levels of hierarchy as it goes; and     b. Start building upper levels only once it becomes apparent that a grace period is not yet over.

Another way to check the per-reader counters $30_1, 30_2 \ldots 30_n$ would be for the grace period detection thread to perform incremental grace-period detection, as follows:

a. Perform partial scan, update state in preparation for next scan;

b. Or just block every so often.

A further way to check the per-reader counters $30_1, 30_2 \ldots 30_n$ would be for several grace period detection threads to perform parallel grace-period detection. The processors could be partitioned so that there is one task scanning each partition, then update higher-level shared state, as follows:

a. could have a hierarchy of tasks, if desired;

b. could have lower levels wake up upper levels;

c. upper-level shared state might be a simple bitmask, or might be another level of counters.

Figure 10:
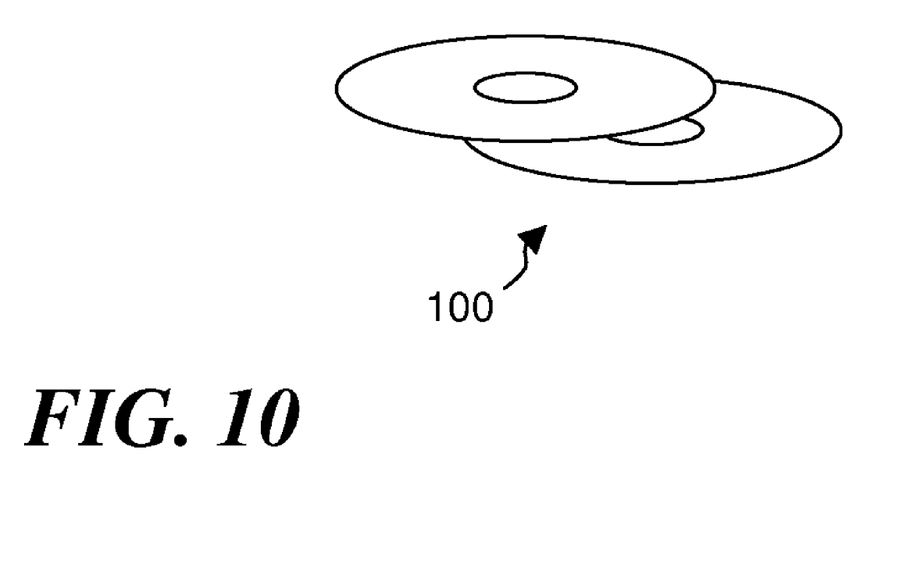
FIG. 10 is a diagrammatic illustration of media that can be used to provide a computer program product for implementing user-level read-copy update.

Accordingly, a user-level read-copy update technique has been disclosed. It will be appreciated that the foregoing concepts may be variously embodied in any of a data processing system, a machine implemented method, and a computer program product in which programming means are provided by one or more machine-readable media for use in controlling a data processing system to perform the required functions. Example machine-readable media for providing such programming means are shown by reference numeral 100 in FIG. 10. The media 100 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming means of the invention, either alone or in conjunction with another software product that incorporates the required functionality. The programming means could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation medium or signal, or other entity that can contain, store, communicate, propagate or transport the programming means for use by or in connection with a data processing system, computer or other instruction execution system, apparatus or device.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A user-level read-copy update (RCU) method, comprising:

establishing a user-level RCU subsystem that executes within threads of a user-level multithreaded application;

said multithreaded application comprising one or more reader threads that read RCU-protected data elements in a shared memory;

said multithreaded application comprising one or more updater threads that update said RCU-protected data elements in said shared memory;

said reader threads and said updater threads being preemptible and comprising signal handlers that process signals;

implementing a reader registration component in said RCU subsystem that registers said reader threads for RCU critical section processing, said reader registration component performing reader registration while said reader threads remain preemptible and with their signal handlers being operational;

implementing a reader unregistration component in said RCU subsystem that unregisters said reader threads from RCU critical section processing, said reader unregistration component performing reader unregistration while said reader threads remain preemptible and their signal handlers are operational; and implementing a grace period detection component in said RCU subsystem that considers a registration status of said reader threads and determines when it is safe to perform RCU second-phase update processing to remove stale versions of updated data elements that are being referenced by said reader threads, or take other RCU second-phase update processing actions.

2. The method of claim 1, wherein said reader registration component registers said reader threads by manipulating per-reader variables that each specify a per-reader grace period number and a per-reader state that determines whether or not said reader threads are in an RCU critical section.

3. The method of claim 2, wherein said grace period detection component maintains a global variable that specifies a global grace period number and a global reference state, and wherein consideration of said reader registration status comprises comparing said per-reader variables to said global variable and determining that it is safe to perform said RCU second-phase update processing if all of said per-reader variables indicate a per-reader state that is same as said global reference state or if all of said per-reader variables specify a per-reader grace period that is not earlier than a current grace period specified by said global grace period number.

4. The method of claim 1, further including ensuring integrity of said reader registration status when considered by said grace period detection component by either (1) said registration component, said unregistration component and said grace period detection component implementing memory barriers that coordinate their respective processing, or (2) said reader threads implementing a signal handler that reports said reader registration status to said grace period detection component, whereby, in either case, said grace period detection component does not determine it is safe to perform said RCU second-phase update processing until all of said reader threads are safe from such processing.

5. The method of claim 1, wherein said registration component refrains from registering said reader threads for RCU critical section processing if said reader threads are performing nested RCU read operations and said reader threads have already been registered for RCU critical section processing.

6. The method of claim 1, wherein said grace period detection component performs batched grace period detection processing.

7. A data processing system for implementing user-level read-copy update (RCU), comprising:
one or more processors;
a memory coupled to said one or more processors, said memory including a machine-readable medium tangibly embodying at least one program of instructions executable by said processor to perform operations, comprising:
establishing a user-level RCU subsystem that executes within threads of a user-level multithreaded application;
said multithreaded application comprising one or more reader threads that read RCU-protected data elements in a shared memory;

said multithreaded application comprising one or more updater threads that update said RCU-protected data elements in said shared memory;

said reader threads and said updater threads being preemptible and comprising signal handlers that process signals;

implementing a reader registration component in said RCU subsystem that registers said reader threads for RCU critical section processing, said reader registration component performing reader registration while said reader threads remain preemptible and with their signal handlers being operational;

implementing a reader unregistration component in said RCU subsystem that unregisters said reader threads from RCU critical section processing, said reader unregistration component performing reader unregistration while said reader threads remain preemptible and their signal handlers are operational; and implementing a grace period detection component in said RCU subsystem that considers a registration status of said reader threads and determines when it is safe to perform RCU second-phase update processing to remove stale versions of updated data elements that are being referenced by said reader threads, or take other RCU second-phase update processing actions.

8. The system of claim 7, wherein said reader registration component registers said reader threads by manipulating per-reader variables that each specify a per-reader grace period number and a per-reader state that determines whether or not said reader threads are in an RCU critical section.

9. The system of claim 8, wherein said grace period detection component maintains a global variable that specifies a global grace period number and a global reference state, and wherein consideration of said reader registration status comprises comparing said per-reader variables to said global variable and determining that it is safe to perform said RCU second-phase update processing if all of said per-reader variables indicate a per-reader state that is same as said global reference state or if all of said per-reader variables specify a per-reader grace period that is not earlier than a current grace period specified by said global grace period number.

10. The system of claim 7, wherein the operations further include ensuring integrity of said reader registration status when considered by said grace period detection component by either (1) said registration component, said unregistration component and said grace period detection component implementing memory barriers that coordinate their respective processing, or (2) said reader threads implementing a signal handler that reports said reader registration status to said grace period detection component, whereby, in either case, said grace period detection component does not determine it is safe to perform said RCU second-phase update processing until all of said reader threads are safe from such processing.

11. The system of claim 7 wherein said registration component refrains from registering said reader threads for RCU critical section processing if said reader threads are performing nested RCU read operations and said reader threads have already been registered for RCU critical section processing.

12. The system of claim 7 wherein said grace period detection component performs batched grace period detection processing.

13. A computer program product, comprising:
one or more non-transitory machine-readable media tangibly embodying at least one program of instructions executable by a processor to perform operations for programming a data processing platform to implement user-level read-copy update (RCU), comprising:

establishing a user-level RCU subsystem that executes within threads of a user-level multithreaded application;

said multithreaded application comprising one or more reader threads that read RCU-protected data elements in a shared memory;

said multithreaded application comprising one or more updater threads that update said RCU-protected data elements in said shared memory;

said reader threads and said updater threads being preemptible and comprising signal handlers that process signals;

implementing a reader registration component in said RCU subsystem that registers said reader threads for RCU critical section processing, said reader registration component performing reader registration while said reader threads remain preemptible and with their signal handlers being operational;

implementing a reader unregistration component in said RCU subsystem that unregisters said reader threads from RCU critical section processing, said reader unregistration component performing reader unregistration while said reader threads remain preemptible and their signal handlers are operational; and implementing a grace period detection component in said RCU subsystem that considers a registration status of said reader threads and determines when it is safe to perform RCU second-phase update processing to remove stale versions of updated data elements that are being referenced by said reader threads, or take other RCU second-phase update processing actions.

14. The computer program product of claim 13, wherein said reader registration component registers said reader threads by manipulating per-reader variables that each specify a per-reader grace period number and a per-reader state that determines whether or not said reader threads are in an RCU critical section.

15. The computer program product of claim 14, wherein said grace period detection component maintains a global variable that specifies a global grace period number and a global reference state, and wherein consideration of said reader registration status comprises comparing said per-reader variables to said global variable and determining that it is safe to perform said RCU second-phase update processing if all of said per-reader variables indicate a per-reader state that is same as said global reference state or if all of said per-reader variables specify a per-reader grace period that is not earlier than a current grace period specified by said global grace period number.

16. The computer program product of claim 13, further including ensuring integrity of said reader registration status when considered by said grace period detection component by either (1) said registration component, said unregistration component and said grace period detection component implementing memory barriers that coordinate their respective processing, or (2) said reader threads implementing a signal handler that reports said reader registration status to said grace period detection component, whereby, in either case, said grace period detection component does not determine it is safe to perform said RCU second-phase update processing until all of said reader threads are safe from such processing.

17. The computer program product of claim 13, wherein said registration component refrains from registering said reader threads for RCU critical section processing if said reader threads are performing nested RCU read operations and said reader threads have already been registered for RCU critical section processing.

18. The computer program product of claim 13, wherein said grace period detection component performs batched grace period detection processing.

19. A user-level read-copy update (RCU) method, comprising:

establishing a global grace period variable in a shared memory that is shared with a user-level multithreaded application;

said global variable maintaining a global grace period number and a global reference state, and being writable on behalf of an updater thread in said multithreaded application that needs to update an RCU protected data element in said shared memory;

establishing a per-reader grace period variable for any reader thread in said multithreaded application that needs to access said RCU-protected data element in said shared memory;

when one of said reader threads (active reader) needs to enter an RCU-protected critical section to access one of said data elements, performing reader registration, as by:

setting said active reader's per-reader variable to indicate a per-reader status that includes a per-reader grace period value and a per-reader state that indicate said active reader is in an RCU-protected critical section;

executing a memory barrier to ensure that setting of said active reader's per-reader variable can be seen by other threads before said active reader commences critical section processing;

when said active reader needs to exit said RCU-protected critical section after accessing one of said data elements, performing reader unregistration, as by:

executing a memory barrier to ensure that said active reader's critical section processing has completed before any further manipulation of said active reader's per-reader variable value can be seen by other threads;

resetting said active reader's per-reader variable to indicate a per-reader status that includes a current per-reader grace period value and a per-reader state that indicates said active reader is not in an RCU-protected critical section;

when said updater thread needs to free a stale data element due to a data element update, or take other RCU second-phase update processing actions, performing grace period detection processing, as by:

executing a memory barrier to ensure that said data element update is seen by other threads as occurring before said grace period detection processing;

setting said global variable to a value that indicates a new grace period and said global reference state;

executing a memory barrier to ensure that said setting of said global variable is seen by other threads as occurring before further grace period detection processing;

inspecting said per-reader variables to determine per-reader status by comparing said per-reader grace period value and per-reader state to said global grace period value and global reference state until it is determined that none of said reader threads are within an RCU-protected critical section that was entered during a previous grace period; and executing a memory barrier to ensure that said stale data element is not freed until said inspecting is seen by other threads as being completed.

20. The method of claim 19, wherein said global reference state and per-reader state are respectively indicated using a low-order bit, a sign bit, or one or more other bits of said global variable and said per-reader variables.

* * * * *